(12) United States Patent
Makarov et al.

(10) Patent No.: US 9,305,388 B2
(45) Date of Patent: Apr. 5, 2016

(54) BIT-COUNT TEXTURE FORMAT

(71) Applicant: NVIDIA Corporation, Santa Clara, CA (US)

(72) Inventors: Evgeny Evgenievich Makarov, Moscow (RU); Alexey Yuryevich Panteleev, Moscow (RU); Sergey Aleksandrovich Bolotov, Moscow (RU); Yury Uralsky, Santa Clara, CA (US)

(73) Assignee: NVIDIA Corporation, Santa Clara, CA (US)

(*) Notice: Subject to any disclaimer, the term of this patent is extended or adjusted under 35 U.S.C. 154(b) by 350 days.

(21) Appl. No.: 13/975,089

(22) Filed: Aug. 23, 2013

(65) Prior Publication Data

US 2015/0054845 A1    Feb. 26, 2015

(51) Int. Cl.
*G06T 15/00* (2011.01)
*G06T 15/04* (2011.01)
*G06T 15/50* (2011.01)

(52) U.S. Cl.
CPC .............. *G06T 15/005* (2013.01); *G06T 15/04* (2013.01); *G06T 15/503* (2013.01)

(58) Field of Classification Search
None
See application file for complete search history.

(56) References Cited

U.S. PATENT DOCUMENTS

| 7,876,332 | B1 * | 1/2011 | Donham | G06T 15/005 345/421 |
| 2010/0128059 | A1 * | 5/2010 | Shih | G09G 5/42 345/604 |

OTHER PUBLICATIONS

Schwarz, Michael, and Hans-Peter Seidel. "Fast parallel surface and solid voxelization on GPUs." ACM Transactions on Graphics (TOG). vol. 29. No. 6. ACM, 2010.*

* cited by examiner

*Primary Examiner* — Zhengxi Liu
(74) *Attorney, Agent, or Firm* — Zilka-Kotab, PC

(57) ABSTRACT

A system, method, and computer program product are provided for using a bit-count texture format. A rasterized coverage bit mask is received by a texture processing unit from a bit-count format texture map, the rasterized coverage bit mask is converted to a scalar value, and the scalar value is processed while the rasterized coverage bit mask is retained in the bit-count format texture map. The coverage bit mask may be converted by computing a count of samples that are covered by at least one graphics primitive according to the rasterized coverage bit mask.

20 Claims, 9 Drawing Sheets

BIT-COUNT TEXTURE FORMAT

FIELD OF THE INVENTION

The present invention relates to graphics processing, and more particularly to texture maps.

BACKGROUND

Conventional graphics processors may be configured to perform voxel-based global illumination or ambient occlusion calculations, where a voxel is a volumetric pixel. Some voxel-based global illumination and ambient occlusion calculations compute an opacity value for each voxel. Computing the opacity values typically requires accessing memory multiple times to read per-pixel coverage data and store intermediate data. The multiple memory accesses may reduce processing performance for voxel-based global illumination and ambient occlusion calculations.

Thus, there is need for addressing this issue and/or address other issues associated with the prior art.

SUMMARY

A system, method, and computer program product are provided for using a bit-count texture format. A rasterized coverage bit mask is received by a texture processing unit from a bit-count format texture map, the rasterized coverage bit mask is converted to a scalar value, and the scalar value is processed while the rasterized coverage bit mask is retained in the bit-count format texture map. The coverage bit mask may be converted by computing a count of samples that are covered by at least one graphics primitive according to the rasterized coverage bit mask.

DETAILED DESCRIPTION

A new "bit-count" texture format may be used to store rasterized coverage bit masks for a display surface, such as a plane of a voxel representation. When a rasterized coverage bit mask is read from a bit-count format texture map, the rasterized coverage bit mask is interpreted as an opacity value. More specifically, in one embodiment, the rasterized coverage bit mask is converted to a scalar value by computing a count of samples that are covered by at least one graphics primitive. For example, when half of the samples for a pixel are covered, according to the rasterized coverage bit mask, the scalar value is computed as 0.5. The rasterized coverage bit mask is retained in the bit-count format texture map during the conversion process and while the scalar value is processed.

In one embodiment, the scalar value may be represented in a floating-point format (e.g., 16 or 32 bits per pixel). The computed scalar values for the pixels within a voxel may be combined to produce an opacity value for the voxel. Additionally, the bit-count texture format may be used for performing multi-sample operations, voxel-based global illumination, and ambient occlusion calculations.

Figure 1:
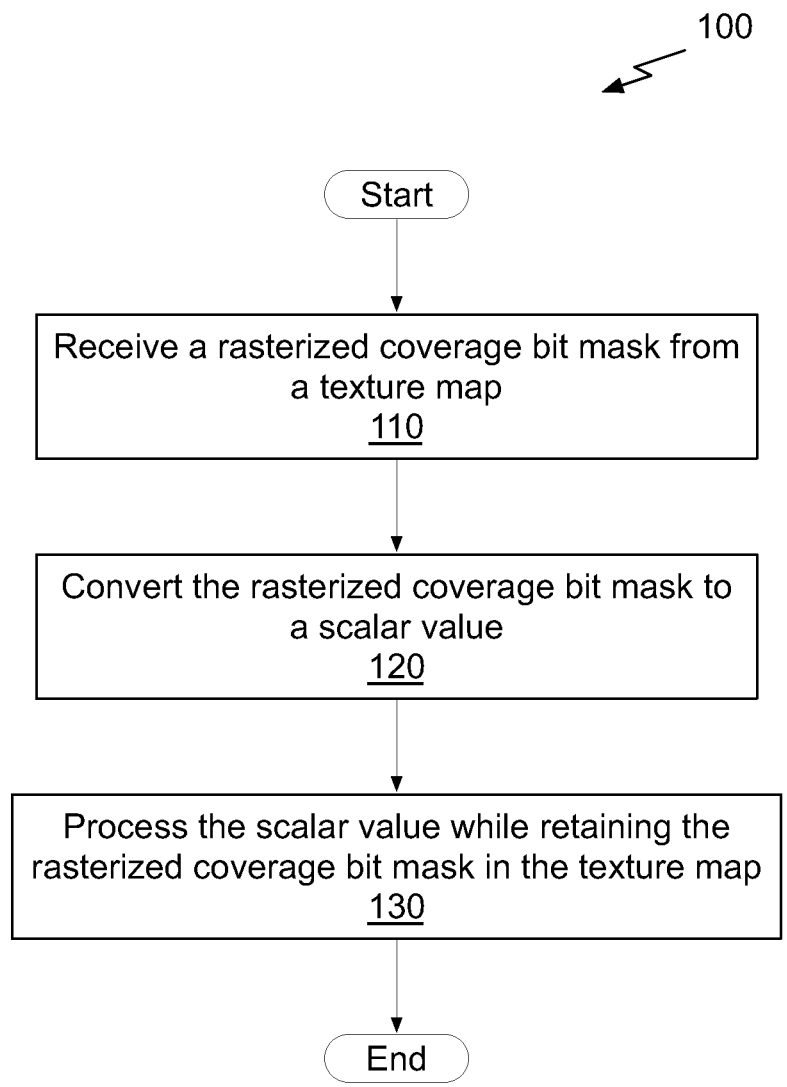
FIG. 1 illustrates a flowchart of a method for using a bit-count texture, in accordance with one embodiment.

FIG. 1A illustrates a flowchart of a method 100 for using a bit-count texture format, in accordance with one embodiment. At operation 110, a rasterized coverage bit mask for a pixel is received from a texture map. In the context of the following description, the rasterized coverage bit mask for a pixel indicates which samples of the pixel, if any, are covered by at least one graphics primitive.

At operation 120, the rasterized coverage bit mask for a pixel is converted to a scalar value. The rasterized coverage bit mask may be converted by computing a count of the samples that are covered according to the rasterized coverage bit mask. In one embodiment the scalar value may represent a per-pixel opacity. At operation 130, the scalar value is processed. The rasterized coverage bit mask for the pixel may be retained within the texture map. In one embodiment, the scalar value may be filtered to produce a per-pixel region opacity or a per-voxel opacity.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
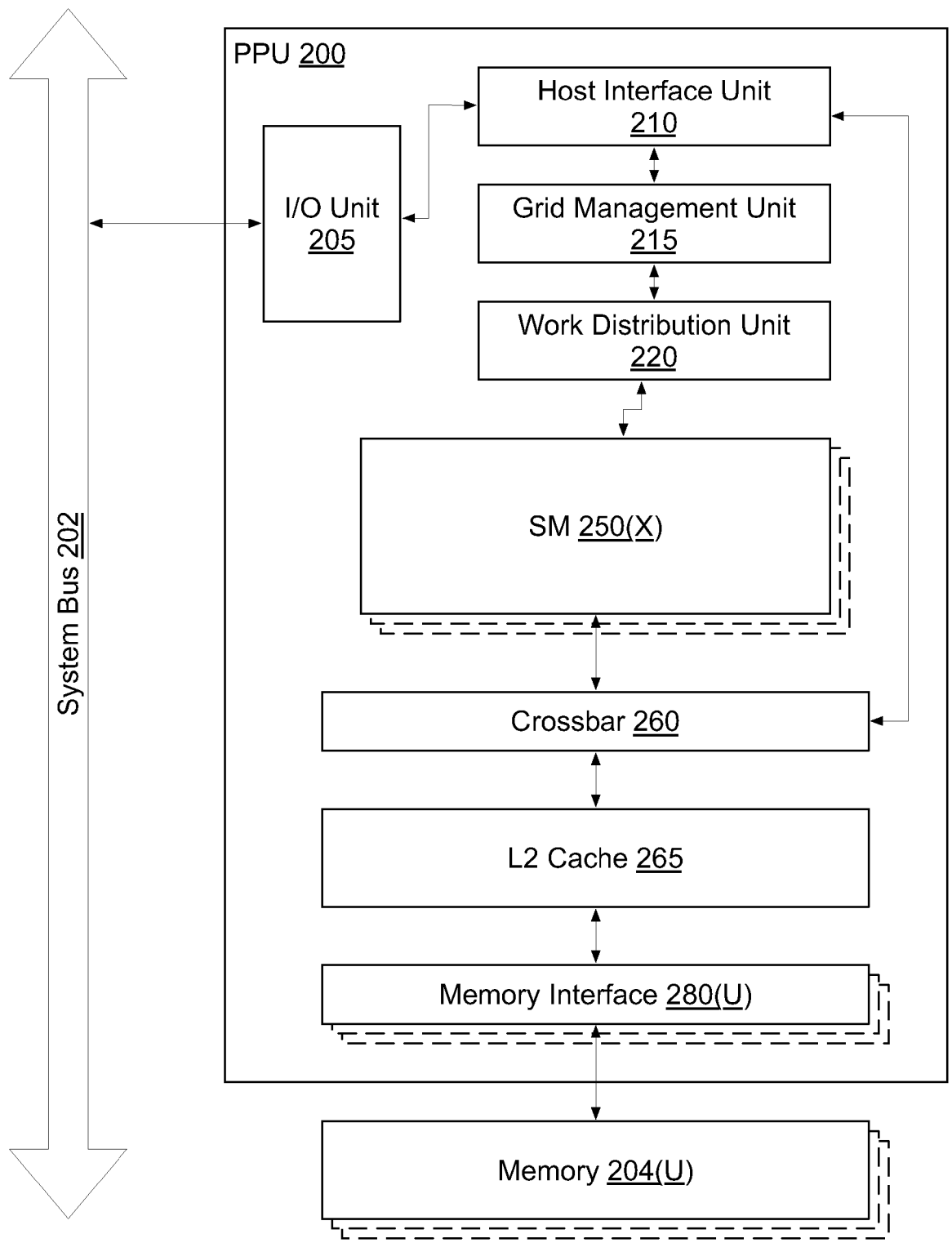
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 comprises X streaming multi-processors (SMs) 250 and is configured to execute a plurality of threads concurrently in two or of the SMs 250(X). A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. In one embodiment, the PPU 200 comprises U memory interfaces 280(U), where each memory interface 280(U) is connected to a corresponding memory device 204(U). The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the grid management unit (GMU) 215 with pointers to one or more streams. The GMU 215 selects one or more streams and is configured to organize the selected streams as a pool of pending grids. In one embodiment, a thread block comprises 32 related threads and a grid is an array of one or more thread blocks that execute the same stream and the different thread blocks may exchange data through global memory. The pool of pending grids may include new grids that have not yet been selected for execution and grids that have been partially executed and have been suspended.

A work distribution unit 220 that is coupled between the GMU 215 and the SMs 250 manages a pool of active grids, selecting and dispatching active grids for execution by the SMs 250. Pending grids are transferred to the active grid pool by the GMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the GMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMT (Single-Instruction, Multiple-Thread) architecture where each thread block (i.e., warp) in a grid is concurrently executed on a different data set by different threads in the thread block. The driver kernel defines thread blocks that are comprised of k related threads, such that threads in the same thread block may exchange data through shared memory.

In one embodiment, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 215 may configure one or more SMs 250 to execute a vertex shader program that processes a number of vertices defined by the model data. In one embodiment, the GMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
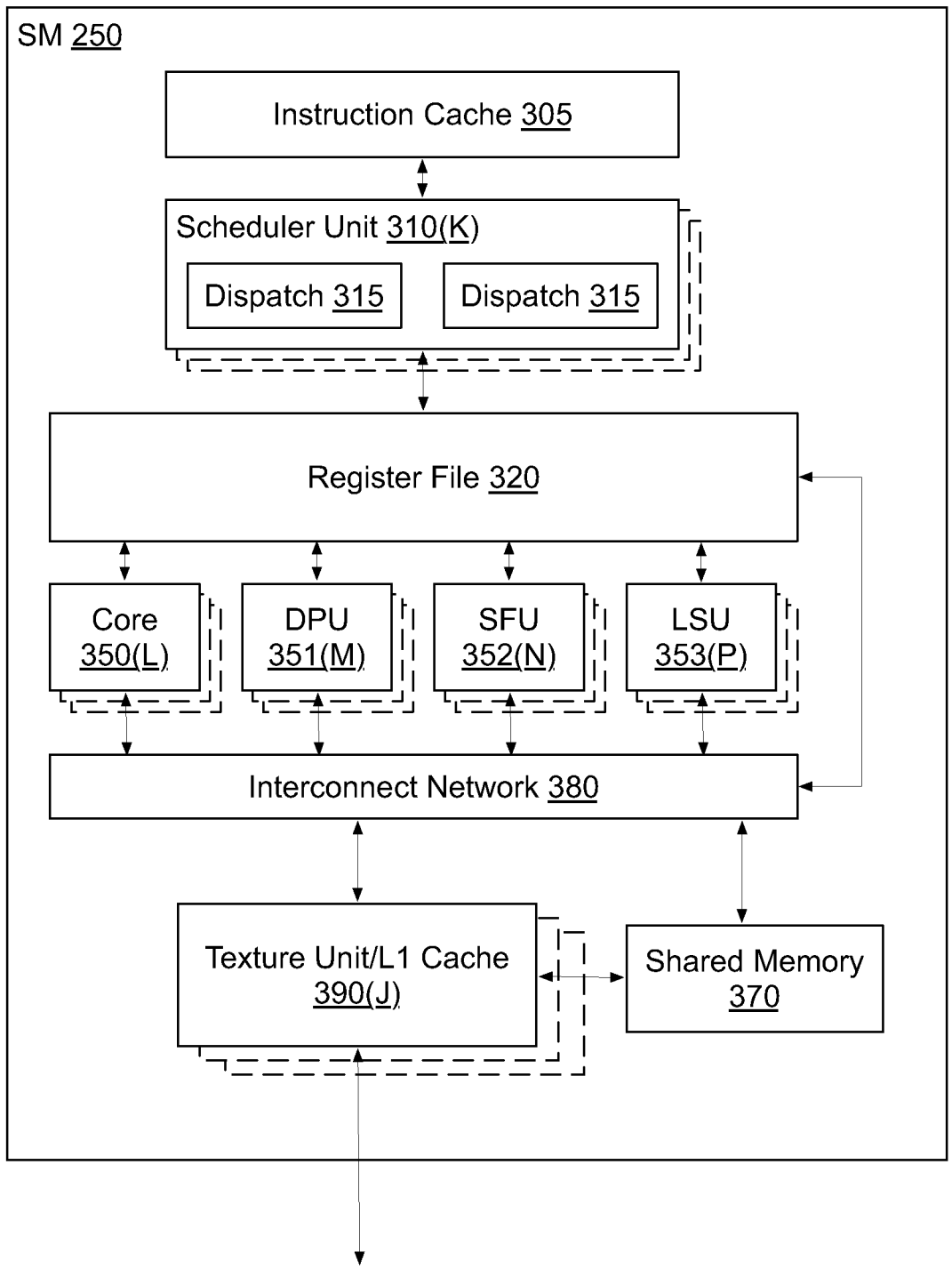
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory 370, and one or more texture unit/L1 caches 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 350 includes a register file 320 that provides a set of registers for the functional units of the SM 350. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory 370 and the register file 320 via the J texture unit/L1 caches 390 and the interconnect network 380. The J texture unit/L1 caches 390 are coupled between the interconnect network 380 and the shared memory 370 and are also coupled to the crossbar 260. In one embodiment, the SM 250 includes 64 DPUs 351, 32 SFUs 352, and 32 LSUs 353.

In another embodiment, the L1 cache is not included within the texture unit and is instead included with the shared memory 370 with a separate direct connection to the crossbar 260.

Each SM 250 includes an interconnect network 380 that connects each of the functional units to the register file 320 and to the shared memory 370 through the interconnect network 380. In one embodiment, the interconnect network 380 is a crossbar that can be configured to connect any of the functional units to any of the registers in the register file 320, to any of the J texture unit/L1 caches 390, or the memory locations in shared memory 370.

In one embodiment, the SM 250 is implemented within a GPU. In such an embodiment, the SM 250 comprises J texture unit/L1 caches 390. The texture unit/L1 caches 390 include texture processing circuitry that is configured to access texture maps (i.e., a 2D array of texels) from the memory 204 and sample the texture maps to produce sampled texture values for use in shader programs. The texture unit/L1 caches 390 implement texture operations using mip-maps (i.e., texture maps of varying levels of detail). In one embodiment, the SM 250 includes 16 texture unit/L1 caches 390. As described further herein, the texture unit/L1 caches 390 are also configured to receive load and store requests from the LSUs 353 and to coalesce the texture accesses and the load and store requests to generate coalesced memory operations that are output to a memory system that includes the shared memory 370. The memory system may also include the L2 cache 265, memory 204, and a system memory (not shown).

The PPU 200 described above may be configured to perform highly parallel computations much faster than conventional CPUs. Parallel computing has advantages in graphics processing, data compression, biometrics, stream processing algorithms, and the like.

Figure 4:
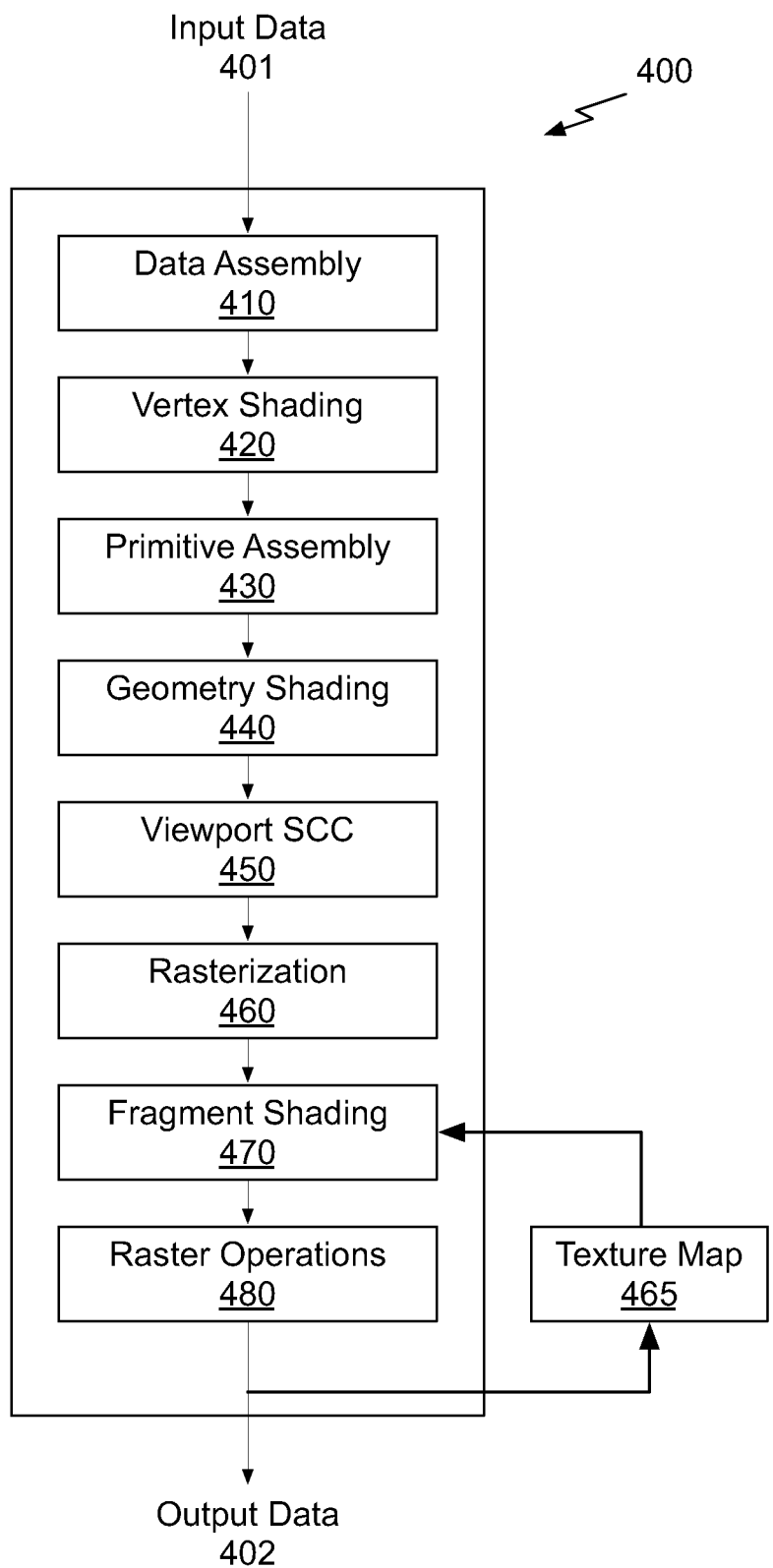
FIG. 4 is a conceptual diagram of a graphics processing pipeline implemented by the PPU of FIG. 2, in accordance with one embodiment.

FIG. 4 is a conceptual diagram of a graphics processing pipeline 400 implemented by the PPU 200 of FIG. 2, in accordance with one embodiment. The graphics processing pipeline 400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 400 receives input data 401 that is transmitted from one stage to the next stage of the graphics processing pipeline 400 to generate output data 402. In one embodiment, the graphics processing pipeline 400 may represent a graphics processing pipeline defined by the OpenGL® API.

As shown in FIG. 4, the graphics processing pipeline 400 comprises a pipeline architecture that includes a number of stages. The stages include, but are not limited to, a data assembly stage 410, a vertex shading stage 420, a primitive assembly stage 430, a geometry shading stage 440, a viewport scale, cull, and clip (SCC) stage 450, a rasterization stage 460, a fragment shading stage 470, and a raster operations stage 480. In one embodiment, the input data 401 comprises commands that configure the processing units to implement the stages of the graphics processing pipeline 400 and geometric primitives (e.g., points, lines, triangles, quads, triangle strips or fans, etc.) to be processed by the stages. The output data 402 may comprise pixel data (i.e., color data) that is copied into a frame buffer or other type of surface data structure in a memory.

The data assembly stage 410 receives the input data 401 that specifies vertex data for high-order surfaces, primitives, or the like. The data assembly stage 410 collects the vertex data in a temporary storage or queue, such as by receiving a command from the host processor that includes a pointer to a buffer in memory and reading the vertex data from the buffer. The vertex data is then transmitted to the vertex shading stage 420 for processing.

The vertex shading stage 420 processes vertex data by performing a set of operations (i.e., a vertex shader or a program) once for each of the vertices. Vertices may be, e.g., specified as a 4-coordinate vector associated with one or more vertex attributes. The vertex shading stage 420 may manipulate properties such as position, color, texture coordinates, and the like. In other words, the vertex shading stage 420 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 420 generates transformed vertex data that is transmitted to the primitive assembly stage 430.

The primitive assembly stage 430 collects vertices output by the vertex shading stage 420 and groups the vertices into geometric primitives for processing by the geometry shading stage 440. For example, the primitive assembly stage 430 may be configured to group every three consecutive vertices as a geometric primitive (i.e., a triangle) for transmission to the geometry shading stage 440. In some embodiments, specific vertices may be reused for consecutive geometric primitives (e.g., two consecutive triangles in a triangle strip may share two vertices). The primitive assembly stage 430 transmits geometric primitives (i.e., a collection of associated vertices) to the geometry shading stage 440.

The geometry shading stage 440 processes geometric primitives by performing a set of operations (i.e., a geometry shader or program) on the geometric primitives. Tessellation operations may generate one or more geometric primitives from each geometric primitive. In other words, the geometry shading stage 440 may subdivide each geometric primitive into a finer mesh of two or more geometric primitives for processing by the rest of the graphics processing pipeline 400. The geometry shading stage 440 transmits geometric primitives to the viewport SCC stage 450.

The viewport SCC stage 450 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plan, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on depth of the viewing frustum. All potentially visible geometric primitives are then transmitted to the rasterization stage 460.

The rasterization stage 460 converts the 3D geometric primitives into 2D fragments. The rasterization stage 460 may be configured to utilize the vertices of the geometric primitives to setup a set of plane equations from which various attributes can be interpolated. The rasterization stage 460 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 460 generates fragment data (i.e., interpolated vertex attributes associated with a particular sample location for each covered pixel) that are transmitted to the fragment shading stage 470.

The fragment shading stage 470 processes fragment data by performing a set of operations (i.e., a fragment shader or a program) on each of the fragments. The fragment shading stage 470 may generate pixel data (i.e., color values) for the fragment such as by performing lighting operations or sampling texture maps using interpolated texture coordinates for the fragment. The fragment shading stage 470 generates pixel data that is transmitted to the raster operations stage 480.

The raster operations stage 480 may perform various operations on the pixel data such as performing alpha tests, stencil tests, and blending the pixel data with other pixel data corresponding to other fragments associated with the pixel. When the raster operations stage 480 has finished processing the pixel data (i.e., the output data 402), the pixel data may be written to a render target such as a frame buffer, a color buffer, or the like.

The rasterized coverage bit masks that are generated by the rasterization stage 460 may pass through the fragment shading stage 470 and raster operations stage 480 and be written to a texture map 465 that is stored in memory 204. In another embodiment, the rasterization stage 460 writes the texture map 465 directly. The texture map 465 may be represented in a bit-count texture format so that each rasterized coverage bit mask that is read by the fragment shading stage 470 is converted into a scalar value that represents opacity. In one embodiment, the rasterized coverage masks stored in the texture map 465 are retained and are not overwritten with the scalar values. The rasterized coverage bit masks may be very compact compared with the corresponding scalar values. For example, each rasterized coverage bit mask may be as small as one bit-per-pixel compared with 16 or more bits that represent a floating-point format scalar value.

It will be appreciated that one or more additional stages may be included in the graphics processing pipeline 400 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 440). Other types of graphics processing pipelines are contemplated as being within the scope of the present disclosure. Furthermore, any of the stages of the graphics processing pipeline 400 may be implemented by one or more dedicated hardware units within a graphics processor such as PPU 200. Other stages of the graphics processing pipeline 400 may be implemented by programmable hardware units such as the SM 250 of the PPU 200.

Figure 5A:
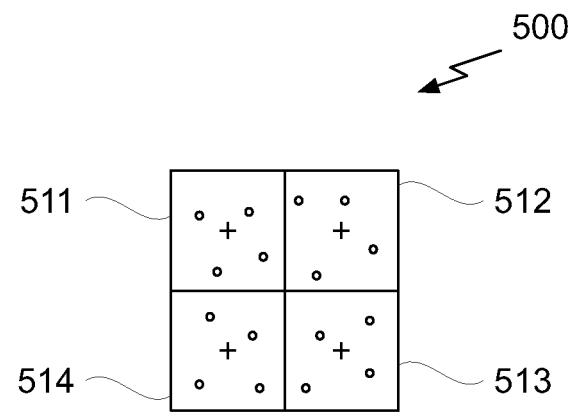
FIG. 5A illustrates a sample pattern, in accordance with one embodiment.

FIG. 5A illustrates a multi-sample pattern, in accordance with one embodiment. As shown in FIG. 5A, a 4× anti-aliasing (4×AA) sample pattern may be defined for a pixel quad 500. The pixel quad 500 is a 2×2 array of pixels (511, 512, 513, and 514). In one embodiment, the sample pattern for the pixel quad 500 comprises each of the pixel centers (shown as cross-hairs in FIG. 5A). In other words, when the PPU 200 is configured to generate pixel data using 4×AA, four sample positions are specified for each pixel. As shown in FIG. 5A, the jittered sample locations for each pixel may be shown by the small circles offset from each pixel's center. In another embodiment, one of the sample positions may be located at the pixel center. Jittering the sample locations and rendering the image at a higher resolution and then downsampling the high-resolution image to generate the resulting image data helps reduce aliasing artifacts significantly. A rasterized coverage bit mask should include a bit for each sample location of a pixel.

Figure 5B:
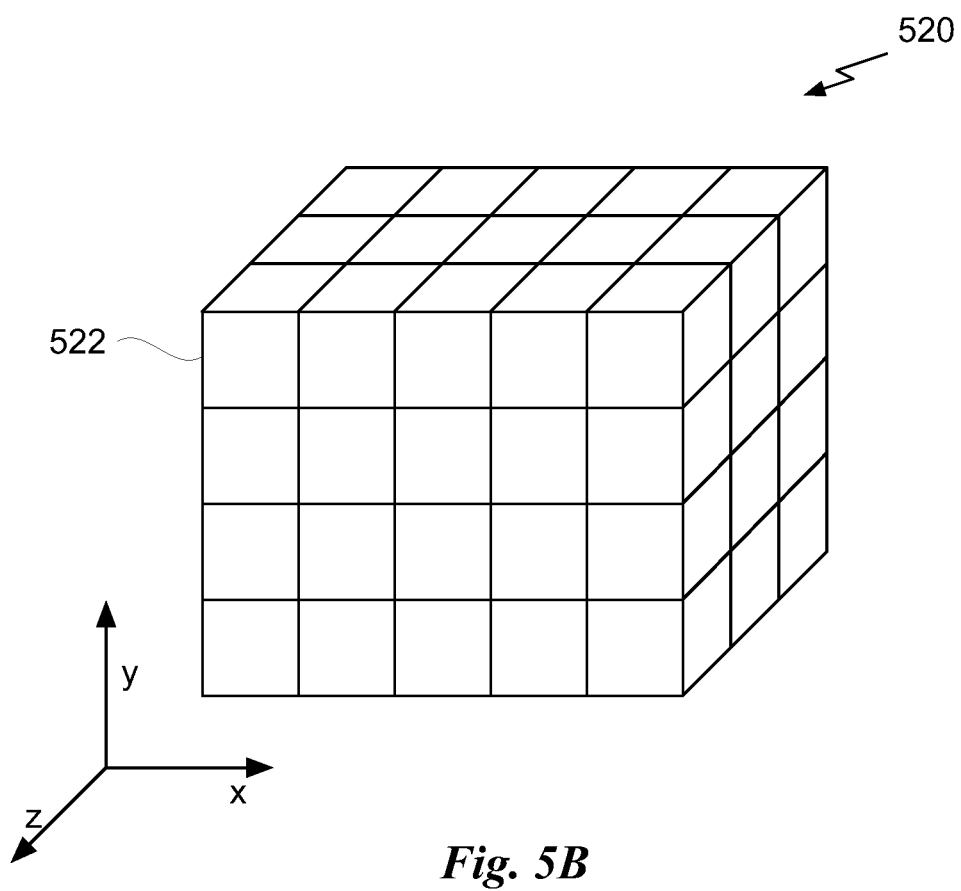
FIG. 5B illustrates a voxel volume, according to one embodiment.

FIG. 5B illustrates a voxel volume 520, according to one embodiment. A voxel 522 represents one or more volumetric pixels. The voxel volume 520 includes 60 voxels. In other embodiments, more or less voxels may be included in the voxel volume 520. Each volumetric pixel 522 may include one or more sample locations. To perform voxel-based global illumination or ambient occlusion calculations, scene geometry is rasterized as viewed along the x, y, and z axis. Therefore, three different projections are rasterized to generate rasterized coverage bit masks for the pixels in each voxel, where each projection corresponds to a different plane of the voxel volume 520 (e.g., x-y plane, x-z plane, and y-z plane). One or more of the projections may correspond to the sample positions shown in FIG. 5A for the x-y plane, x-z plane, and/or the y-z plane. In another embodiment, one or more of the projections may correspond to different sample positions for the x-y plane, x-z plane, and/or the y-z plane. In one embodiment, a bit-count texture format is defined that includes at least 3 channels of data so that each channel stores the rasterized coverage bit masks for a different plane of the voxel volume. The rasterized coverage bit masks for each projection may be stored in memory as a single display surface or as three separate display surfaces.

A conventional technique that is used to generate opacity data for voxels stores rasterized coverage bit masks in a conventional texture format such as R32_UINT or R10G10B10A2_UNORM (or other formats defined in the Microsoft® DirectX applications programming interface). While configured in a compute mode, the SM 250 may be configured to read the rasterized coverage bit masks, compute alpha values representing the number of samples that are covered for each pixel, and write intermediate data (e.g., opacity values represented as unsigned integers) without any further processing back to the texture map. The rasterized coverage bit masks are overwritten by the unsigned integer values, so that the rasterized coverage bit masks are not retained in the texture map. The intermediate data is written to the same texture map because storing the intermediate data would consume twice as much memory and the rasterized coverage bit masks are not needed after they are converted.

The conventional conversion technique reads the texture map and also writes intermediate data to the texture map, thereby consuming twice as much memory bandwidth as is needed to just read the texture map. In contrast, when a bit-count texture format is used, the bit-count format texture map 465 is read and is not written during the conversion process which is performed while the SM 250 is configured in a graphics mode. Each rasterized coverage bit mask is converted to a scalar value when the rasterized coverage bit mask is read and the rasterized coverage bit masks are retained in the bit-count format texture map 465. Therefore, the format of the scalar value is not limited to a number of bits that can be stored in the bit-count format texture map 465. The scalar value may be represented by a number of bits that is less than, equal to, or greater than the number of bits used to represent a corresponding rasterized coverage bit mask. Some operations, such as those used to implement voxel-based global illumination or ambient occlusion calculations use 16 or 32 bit floating-point format scalar values that represent opacity. When the bit-count format is used for the texture map 465, the number of bits representing the rasterized coverage bit mask for each pixel may be less than the number of bits representing the scalar value for the pixel. For example, when a 4×AA sample mode is used, 4 bits represent the rasterized coverage bit mask for each pixel and 16 or 32 bits may be used to represent a floating-point format scalar value for each pixel.

The conventional conversion technique performs the conversion process when configured in a compute mode by reading the rasterized coverage bit masks from memory by the SM 250 and computing an opacity value for each pixel. The opacity value is an unsigned integer value that is written back to the memory, overwriting the rasterized coverage bit masks in the memory. When configured in the compute mode, as opposed to a graphics mode, at least some of the graphics processing operations may not be performed. In particular, operations performed by the fragment shading stage 470 and the raster operations stage 480 may not be performed. At a later time, the opacity values are read from the memory to compute an opacity value for each voxel. In sum, the conventional technique reads the texture map, writes the texture map, and then reads the texture map again. In contrast, when a bit-count texture format is used, the texture map 465 is read once when an SM 250 is configured in a graphics mode, the rasterized bit mask is converted to a scalar value and then processed by the fragment shading stage 470 and/or the raster operations stage 480, so the memory access bandwidth is reduced compared with the conventional technique.

Figure 5C:
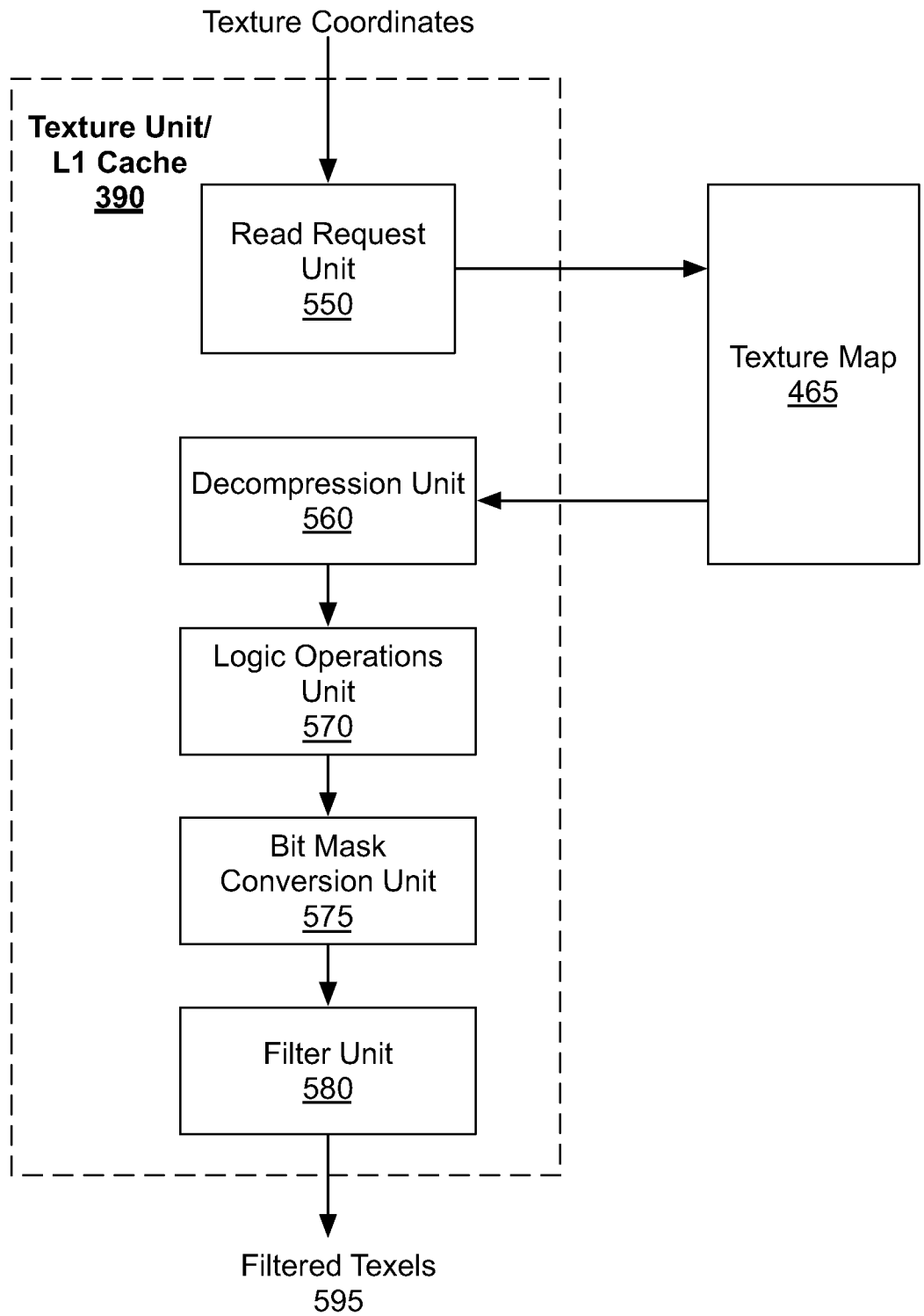
FIG. 5C illustrates a portion of the texture unit/L1 cache of FIG. 3, according to one embodiment.

FIG. 5C illustrates a diagram of a portion of the texture unit/L1 cache 390 of FIG. 3, according to one embodiment. The texture unit/L1 cache 390 includes a read request unit 550, a decompression unit 560, a logic operations unit 570, a bit mask conversion unit 575, and a filter unit 580. A bit-count format texture map 465 stores rasterized coverage bit masks in the bit-count texture format. The texture unit/L1 cache 390 receives texture coordinates corresponding to a rasterized coverage bit mask. The read request unit 550 generates a read request to read the rasterized coverage bit mask from the texture map 465. In one embodiment, data stored using the bit-count texture format may be compressed. Compression may reduce the amount of memory needed to store the texture map 465 and the amount of memory bandwidth that is consumed to access the texture map 465. The rasterized coverage bit mask is received by the decompression unit 560, and, if the rasterized coverage bit mask is compressed, it is decompressed by the decompression unit 560. The logic operations unit 570 may be configured to perform logic operations (e.g., bitwise AND, OR, NOT, and the like) on the rasterized coverage bit mask.

The bit mask conversion unit 575 receives the rasterized coverage bit mask and computes a scalar value that indicates the number of samples that are covered according to the rasterized coverage bit mask. The scalar value represents an opacity corresponding to each rasterized coverage bit mask. The filter unit 580 may be configured to combine the scalar values using filtering operations for one or more pixels to produce a scalar value that represents an opacity corresponding to a voxel or multiple pixels. For example, the filter unit 580 may be configured to sum the per-pixel scalar values and divide by the number of pixels included in a voxel for a voxel plane. The filtered scalar values are output by the texture unit/L1 cache 390 as filtered texels 595.

Figure 6A:
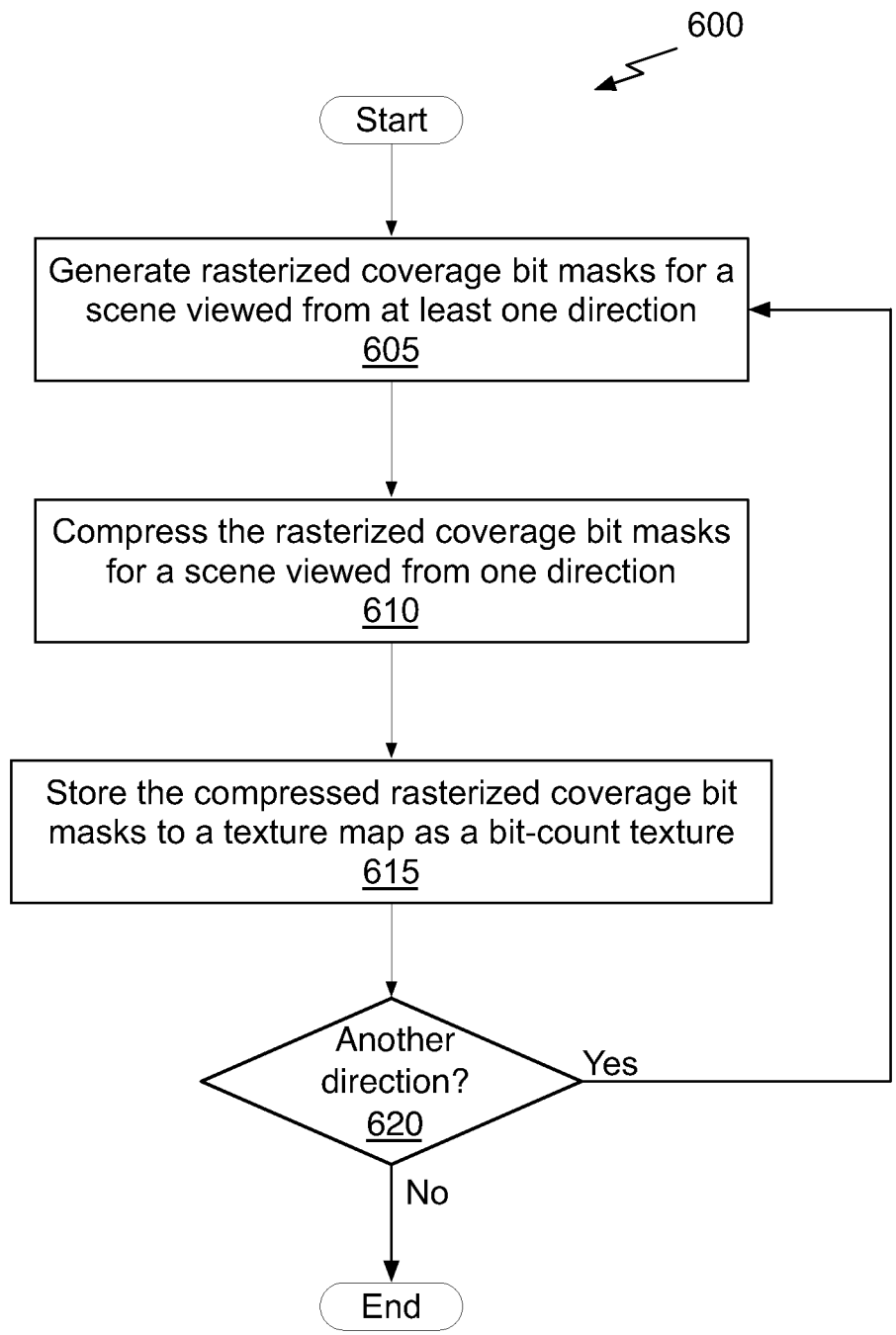
FIG. 6A illustrates a flowchart of a method for generating a rasterized coverage texture map, in accordance with one embodiment.

FIG. 6A illustrates a flowchart of a method 600 for generating the rasterized coverage texture map 465, in accordance with one embodiment. At operation 605, the rasterization stage 460 generates rasterized coverage bit masks from a scene viewed from at least one direction (i.e., corresponding to one plane of a voxel volume). At operation 610, the rasterized coverage bit masks are compressed by the raster operations stage 480. In one embodiment, operation 610 may be skipped if the rasterized coverage bit masks are not compressed. At operation 615, the compressed rasterized coverage bit masks are stored to the texture map 465 as a bit-count texture. At operation 620, the rasterization stage 460 determines if another direction of the scene should be rasterized, and, if not, the method terminates. Otherwise, the rasterization stage 460 returns to operation 605 to generate the rasterized coverage bit masks for the scene viewed from another direction.

Figure 6B:
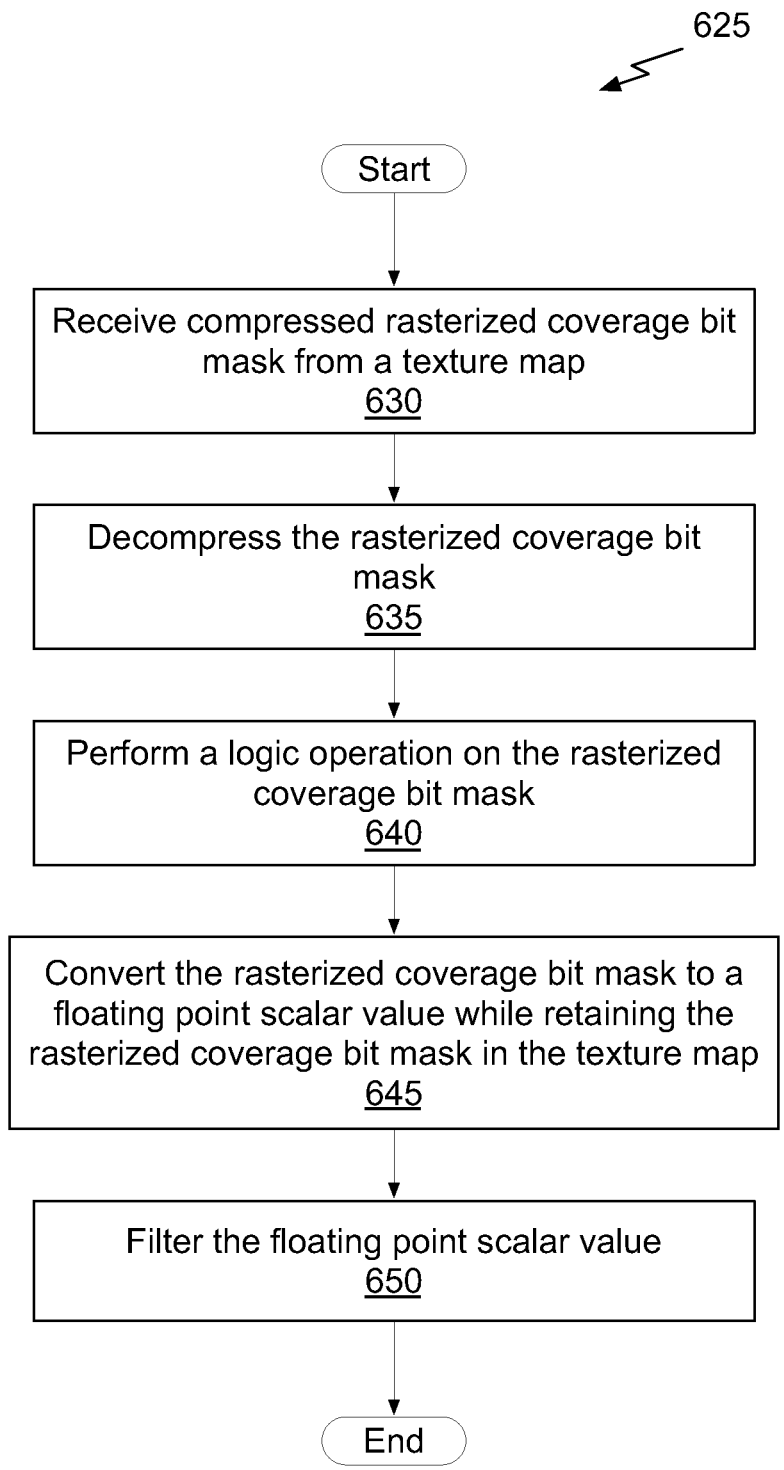
FIG. 6B illustrates another flowchart of a method for using a bit-count texture map, in accordance with one embodiment.

FIG. 6B illustrates another flowchart of a method 625 for using a bit-count texture map, in accordance with one embodiment. At operation 630, a compressed rasterized coverage bit mask is received from the texture map 465 by the texture unit/L1 cache 390. At operation 635, the compressed rasterized coverage bit mask is decompressed by the texture unit/L1 cache 390. At operation 640, a logic operation may be performed on the rasterized coverage bit mask by texture unit/L1 cache 390. At operation 645, the rasterized coverage bit mask is converted to a scalar value by the texture unit/L1 cache 390. At operation 650, the scalar value is filtered by the texture unit/L1 cache 390.

Figure 7:
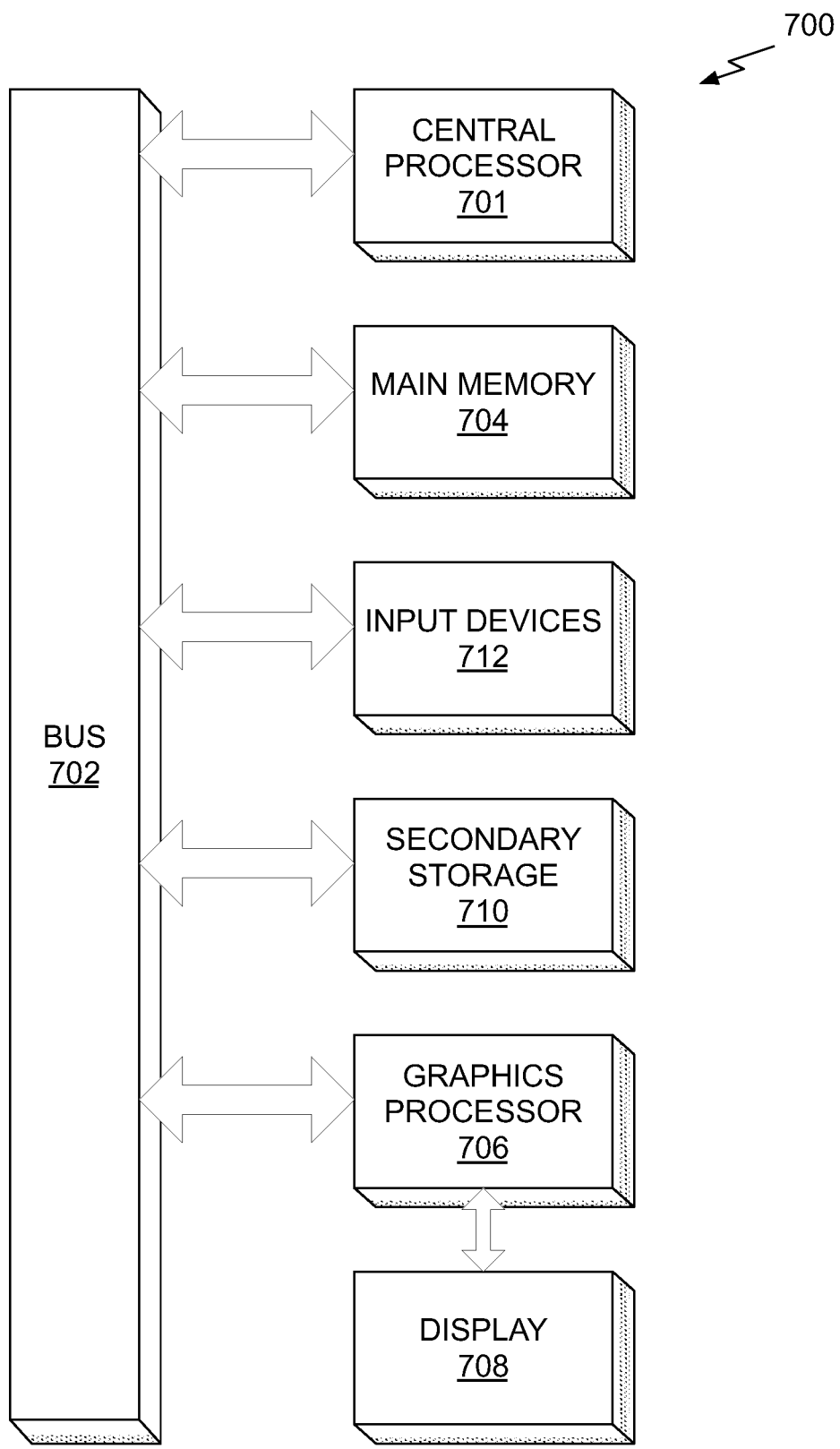
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. For example, a compiler program that is configured to examiner a shader program and enable or disable attribute buffer combining may be stored in the main memory 704. The compiler program may be executed by the central processor 701 or the graphics processor 706. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

reading, by a texture processing unit, a rasterized coverage bit mask from a bit-count format texture map that stores the rasterized coverage bit mask utilizing a bit-count texture format for storing a plurality of rasterized coverage bit masks each associated with a different plane of a voxel volume;

converting the rasterized coverage bit mask to a scalar value;

processing the scalar value while the rasterized coverage bit mask is retained in the bit-count format texture map for reducing memory access bandwidth consumption in connection with at least one voxel associated with the voxel volume; and generating output data, based on the processing, for use in rendering.

2. The method of claim 1, wherein the scalar value is represented in a floating point format.

3. The method of claim 1, wherein the converting comprises computing a count of samples that are covered by at least one graphics primitive according to the rasterized coverage bit mask.

4. The method of claim 1, wherein the scalar value is associated with the at least one voxel and corresponds to a projection of the at least one voxel onto one of an x-y plane, an x-z plane, and a y-z plane.

5. The method of claim 1, further comprising performing a logic operation on the rasterized coverage bit mask before converting the rasterized coverage bit mask.

6. The method of claim 1, wherein the processing comprises filtering.

7. The method of claim 1, wherein a number of bits representing the rasterized coverage bit mask for at least one pixel is less than a number of bits representing the scalar value for the at least one pixel.

8. The method of claim 1, wherein the rasterized coverage bit mask is represented in a compressed format, and further comprising decompressing the rasterized coverage bit mask before converting the rasterized coverage bit mask.

9. The method of claim 1, further comprising generating the rasterized coverage bit mask and additional rasterized coverage bit masks for each pixel of a display surface.

10. The method of claim 9, further comprising:
compressing the rasterized coverage bit mask and the additional rasterized coverage bit masks; and
storing the compressed rasterized coverage bit mask and the compressed additional rasterized coverage bit masks in the bit-count format texture map.

11. The method of claim 9, further comprising storing the rasterized coverage bit mask and the additional rasterized coverage bit masks in the bit-count format texture map.

12. The method of claim 1, wherein the rasterized coverage bit mask corresponds to two or more samples per pixel.

13. A system comprising:
a memory system configured to store a rasterized coverage bit mask in a bit-count format texture map that stores the rasterized coverage bit mask utilizing a bit-count texture format for storing a plurality of rasterized coverage bit masks each associated with a different plane of a voxel volume; and
texture processing unit that is coupled to the memory system and configured to:
read the rasterized coverage bit mask from the bit-count format texture map;
convert the rasterized coverage bit mask to a scalar value;
process the scalar value while the rasterized coverage bit mask is retained in the bit-count format texture map for reducing memory access bandwidth consumption in connection with at least one voxel associated with the voxel volume; and
generate output data, based on the processing, for use in rendering.

14. The system of claim 13, wherein the scalar value is represented in a floating point format.

15. The system of claim 13, wherein the texture processing unit is further configured to compute a count of samples that are covered by at least one graphics primitive according to the rasterized coverage bit mask to convert the rasterized coverage bit mask to the scalar value.

16. The system of claim 13, wherein the scalar value is associated with the at least one voxel and corresponds to a projection of the at least one voxel onto one of an x-y plane, an x-z plane, and a y-z plane.

17. The system of claim 13, wherein the texture processing unit is further configured to perform a logic operation on the rasterized coverage bit mask before converting the rasterized coverage bit mask.

18. The system of claim 13, wherein a number of bits representing the rasterized coverage bit mask for at least one pixel is less than a number of bits representing the scalar value for the at least one pixel.

19. The system of claim 13, wherein the rasterized coverage bit mask corresponds to two or more samples per pixel.

20. A non-transitory computer-readable storage medium storing instructions that, when executed by a processor, cause the processor to perform steps comprising:
reading, by a texture processing unit, a rasterized coverage bit mask from a bit-count format texture map that stores the rasterized coverage bit mask utilizing a bit-count texture format for storing a plurality of rasterized coverage bit masks each associated with a different plane of a voxel volume;
converting the rasterized coverage bit mask to a scalar value;
processing the scalar value while the rasterized coverage bit mask is retained in the bit-count format texture map for reducing memory access bandwidth consumption in connection with at least one voxel associated with the voxel volume; and
generating output data, based on the processing, for use in rendering.

* * * * *